(12) United States Patent
Walden

(10) Patent No.: US 12,066,117 B2
(45) Date of Patent: Aug. 20, 2024

(54) CHECK VALVE HAVING A SPHERICAL LOADING ELEMENT

(71) Applicant: Waters Technologies Corporation, Milford, MA (US)

(72) Inventor: Christopher Walden, Framingham, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 17/738,523

(22) Filed: May 6, 2022

(65) Prior Publication Data

US 2022/0381357 A1 Dec. 1, 2022

Related U.S. Application Data

(60) Provisional application No. 63/193,263, filed on May 26, 2021.

(51) Int. Cl.
*F16K 15/04* (2006.01)
*G01N 30/32* (2006.01)

(52) U.S. Cl.
CPC .......... *F16K 15/042* (2013.01); *F16K 15/048* (2013.01); *G01N 2030/328* (2013.01); *Y10T 137/7908* (2015.04); *Y10T 137/7921* (2015.04)

(58) Field of Classification Search
CPC ................. F16K 15/04; F16K 2200/50; F16K 2200/501; Y10T 137/7908; Y10T 137/7921
See application file for complete search history.

(56) References Cited

U.S. PATENT DOCUMENTS

| 3,031,097 | A | | 4/1962 | Whittam |
| 3,889,687 | A | | 6/1975 | Harris et al. |
| 4,070,237 | A | * | 1/1978 | Woodward ............. F16K 51/02 |
| | | | | 137/533.15 |

(Continued)

FOREIGN PATENT DOCUMENTS

| CN | 2697349 Y | 5/2005 |
| CN | 205190885 U | 4/2016 |

(Continued)

OTHER PUBLICATIONS

International Search Report and Written Opinion in PCT/US2022/028075 mailed on Oct. 4, 2022.

(Continued)

*Primary Examiner* — Kevin F Murphy
(74) *Attorney, Agent, or Firm* — Schmeiser, Olsen & Watts LLP

(57) ABSTRACT

Described is a check valve having a valve housing, a valve seat, a ball and a spherical loading element. The valve seat is disposed proximate to a first end of the bore. The ball is disposed in the bore and is movable between a closed position in which the ball is received against the valve seat and prevents a flow of fluid through the bore and an open position in which the ball is displaced from the valve seat and allows fluid to flow through the bore. The spherical loading element is disposed in the bore and is movable between the ball and the second end of the bore. The spherical loading element applies a supplemental force to move the ball against the valve seat during closing of the check valve. The check valve provides a low and predictable cracking pressure which does not vary significantly between similarly manufactured valves.

20 Claims, 6 Drawing Sheets

(56) References Cited

U.S. PATENT DOCUMENTS

| | | | |
|---|---|---|---|
| 5,507,312 A * | 4/1996 | Dillman | F16K 27/0245 |
| | | | 137/533.15 |
| 6,146,352 A | 11/2000 | Bonnal | |
| 6,662,824 B2 * | 12/2003 | Inage | F16K 15/042 |
| | | | 137/539.5 |
| 7,434,593 B2 * | 10/2008 | Noll | F16K 15/066 |
| | | | 137/454.2 |
| 8,914,928 B2 * | 12/2014 | Huyser | A61G 7/05776 |
| | | | 5/713 |
| 9,291,605 B2 * | 3/2016 | Wagner | F16K 1/42 |
| 9,637,283 B2 * | 5/2017 | Maguire | F04B 43/02 |
| 2004/0120838 A1 * | 6/2004 | Savidge | F04B 39/1006 |
| | | | 417/559 |
| 2011/0094954 A1 | 4/2011 | Wagner | |
| 2018/0313454 A1 | 11/2018 | Imamura | |

FOREIGN PATENT DOCUMENTS

| | | |
|---|---|---|
| DE | 102005024429 A1 | 11/2006 |
| DE | 202006018959 U1 | 2/2007 |
| FR | 1243797 A | 10/1960 |
| FR | 2763688 A1 | 11/1998 |
| JP | H06159235 A | 6/1994 |
| JP | 3113141 U | 9/2005 |
| RU | 2623138 C1 | 6/2017 |

OTHER PUBLICATIONS

International Search Report and Written Opinion in PCT/US2022/028075 mailed on Aug. 19, 2022.

International Preliminary Report on Patentability in PCT/US2022/028075, mailed on Dec. 7, 2023.

\* cited by examiner

CHECK VALVE HAVING A SPHERICAL LOADING ELEMENT

RELATED APPLICATIONS

This application is a non-provisional patent application claiming priority to U.S. Provisional Patent Application No. 63/193,263, filed May 26, 2021, entitled "Check Valve Having a Spherical Loading Element," which is incorporated herein by reference.

FIELD OF THE INVENTION

The disclosed technology relates generally to fluid control valves. More particularly, the technology relates to a check valve having a spherical loading element and a low cracking pressure.

BACKGROUND

Instruments used in analytical and preparative chemistry often include valves to control the flow of fluids. Check valves are one important class of flow-control valves and are typically utilized to permit fluid flow in one direction while impeding fluid flow in the reverse direction. Liquid chromatography systems, for example, typically include check valves in serial communication with respective inlet and outlet ports of a displacement pump to control the direction of fluid flow through the pump.

A ball-and-seat type of chromatography pump check valve is particularly common. A typical configuration employs a stationary seat and a ball that is capable of being displaced toward or away from the seat. In a passive ball-and-seat check valve, fluid flow in one direction urges the ball against the seat, blocking the flow of fluid. Fluid flow in the opposite direction displaces the ball from the seat, opening a pathway through the valve. Some passive check valves include a spring that holds the ball against the seat until a differential fluid pressure across the valve exceeds a threshold pressure determined by the force applied by the spring. This differential pressure is often referred to as the "cracking pressure." A check valve having a lower cracking pressure tends to open more quickly than a check valve having a higher cracking pressure and therefore the check valve having the lower cracking pressure generally improves system responsiveness when beginning a pump intake stroke. In contrast, a spring-assisted check valve, with its associated higher cracking pressure, will generally close faster when the pump transitions to a compression stroke.

The ball for a chromatography pump check valve is commonly fabricated from ruby while the seat is commonly fabricated from sapphire. Alternatively, check valve balls and seats are fabricated from, for example, zirconium oxide, aluminum oxide, or blended-oxide based ceramics. These materials are chosen for desired properties, for example, for their chemical inertness, resistance to wear and cracking, machinability and/or stiffness.

Chromatography pumps are generally high-precision devices, designed to produce substantially stable and reproducible solvent flows at delivery pressures of tens of megapascals (A/Pa) or greater (thousands of pounds per square inch (psi) or greater). Back-leakage of a check valve can degrade or destroy the desired relationship between a control input (such as a pump stepper-motor step rate or step count) and a volume delivery output of chromatography solvent. Thus, considerable effort has been expended by ball-and-seat check valve manufacturers to produce balls that are highly spherical and that have a smooth surface finish. A corresponding effort has been expended by manufacturers to produce seats having a spherical or conical sealing surface with a close tolerance as well as a smooth surface finish.

Though providing a good seal when new, many conventional valves become fouled in service by foreign matter that lodges on either the ball or the sealing surface of the seat. The fouling at times is transient, where the fouling substance is swept downstream on a subsequent valve actuation, or more permanent, where restoration of proper valve function may require valve disassembly and aggressive cleaning or component replacement.

While fouling matter resides on the ball or seat, the check valve may be rendered partially or wholly inoperable due to a failure to properly seal against reverse flow. In another failure mode, the ruby and sapphire materials may become stuck together in the presence of particular solvents or contaminants, rendering the valve inoperable because it cannot enable fluid flow in the forward direction.

Ball and seat check valves sometimes are configured to apply a supplemental loading force to the ball. For example, the supplemental loading force may be applied by a compressed spring disposed inside the valve and arranged to push the ball toward the valve seat. The supplemental loading force results in a positive closing force on the ball regardless of the direction of solvent flow. This supplemental loading force facilitates a fast closure of the check valve during transition from an intake stroke to a delivery stroke of the pump head regardless of orientation of the valve with respect to gravity.

Due to limitations on manufacturing and design tolerances, the cracking pressure required to open a spring-assisted check valve can be significantly greater than for a simple ball and seat check valve. Furthermore, the cracking pressure of similarly designed check valves may vary substantially due to variations in the spring forces of the manufactured springs. For example, the cracking pressure of some check valves employing a compressed spring can vary from less than 3 KPa to greater than 13 KPa (less than 0.4 psi to greater than 1.8 psi). The wide cracking pressure range can limit the resolution of manufacturing tests used to confirm check valve quality after assembly is completed. Consequently, it may be difficult to determine if the cracking pressure for a valve is due in part to contaminants, such as detergent or lapping compound residues, on the ball and/or the seat.

In an alternative configuration, a supplemental loading force is applied by a cylindrical weight in the flow path downstream from the ball and valve seat. As used herein, a cylindrical weight means a weight having a generally cylindrical shape. References to cylindrical weights below include cylindrically-shaped weights which may include one or more features on the weight that depart from a pure cylindrical shape; however, the nominal shape is recognized as a cylinder. The mass of the static cylindrical weight is easier to control as it is not significantly affected by manufacturing tolerances. Consequently, the applied supplemental force does not vary significantly between similarly designed and manufactured valves. Thus, cylindrical weights have a more predictable cracking pressure and the supplemental loading force is generally significantly less than the supplemental loading force for a similarly sized check valve utilizing a compressed spring. For example, the cracking pressure for a check valve having a cylindrical loading weight may have a cracking pressure of a few KPa (i.e., a few tenths psi) or less.

The spring and cylindrical weight configurations each can have various disadvantages such as slow opening and closing response times and/or intermittent pressure drops in the pump output flow. These disadvantages can degrade the accuracy and repeatability of chromatographic separations.

SUMMARY

In one aspect, a check valve includes a valve housing, a valve seat, a ball and a spherical loading element. The valve housing has a bore with a first end and a second end and the valve seat is disposed proximate to the first end. The ball is disposed in the bore and is movable between a closed position in which the ball is received against the valve seat and prevents a flow of fluid through the bore and an open position in which the ball is displaced from the valve seat and allows the flow of fluid through the bore. The spherical loading element is disposed in the bore and movable between the ball and the second end of the bore, the spherical loading element applying a supplemental force to move the ball against the valve seat during closing of the check valve.

The spherical loading element may have a diameter that is greater than a diameter of the ball. The spherical loading element may be formed of a material from a group of materials consisting of at least one of tantalum, stainless steel, tungsten carbide, Inconel® or a non-ferrous alloy.

The check valve may further include at least one additional spherical loading element disposed in the bore between the spherical loading element and the second end of the bore. The spherical loading element may have a diameter that is different from a diameter of at least one of the additional spherical loading elements. The spherical loading element may have a mass that is different from a mass of at least one of the additional spherical loading elements.

The check valve may have a cracking pressure that is less than 5 KPascals.

The bore may have a non-circular cross-section. The bore may have a lower bore section proximate to the first end and an upper bore section proximate to the second end, wherein a diameter of the lower bore section is greater than a diameter of the upper bore section. The ball may be disposed in the lower bore section when the ball is received against the valve seat. The spherical loading element may be disposed in the upper bore section.

The check valve may further include a spacer element having an aperture and disposed in the lower bore section, wherein a diameter of the aperture is less than a diameter of the upper bore section and wherein the ball is disposed in the aperture.

The check valve may further include a fluid channel extending from the second end of the bore to an outlet of the valve housing.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular feature, structure or characteristic described in connection with the embodiment is included in at least one embodiment of the teaching. References to a particular embodiment within the specification do not necessarily all refer to the same embodiment.

The present teaching will now be described in detail with reference to exemplary embodiments thereof as shown in the accompanying drawings. While the present teaching is described in conjunction with various embodiments and examples, it is not intended that the present teaching be limited to such embodiments and examples. On the contrary, the present teaching encompasses various alternatives, modifications, and equivalents, as will be appreciated by those of skill in the art. For example, various embodiments described herein refer to solvents although it should be recognized that other fluids can be used. Those of ordinary skill having access to the teaching herein will recognize additional implementations, modifications, and embodiments, as well as other fields of use, which are within the scope of the present disclosure as described herein.

Figure 1:
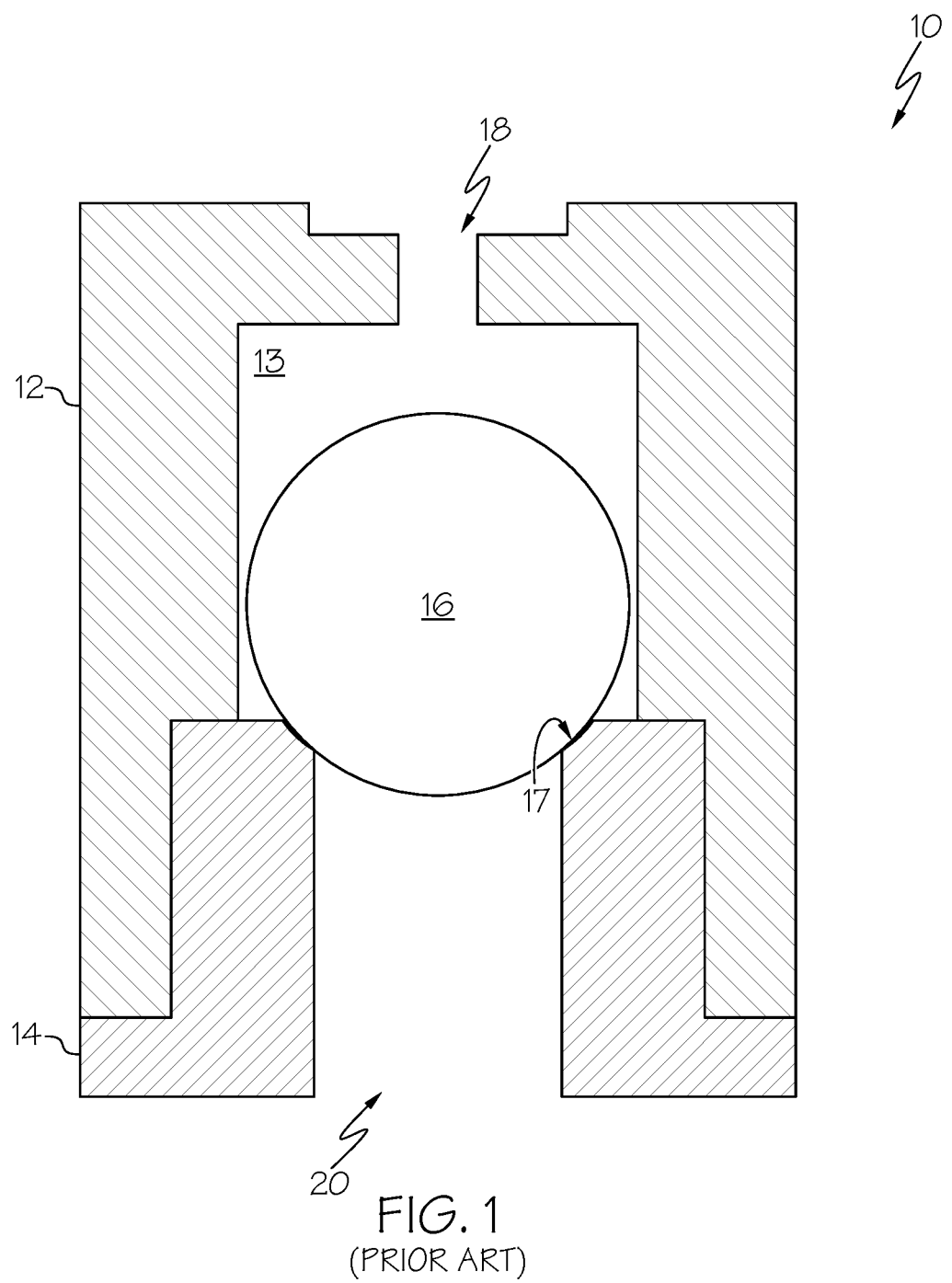
FIG. 1 is a simplified cross-sectional view showing a simplified example of a conventional check valve having a ball and seat configuration.

In liquid chromatography systems, a piston positive displacement pump is often used to deliver precise flow to the system. Flow into and out of the pump head is directionally controlled using check valves which allow flow into the pump head during an intake stroke and out from the pump head during a delivery stroke. FIG. 1 is a cross-sectional view showing a simplified example of a conventional check valve 10 having a ball and seat configuration. The valve 10 includes a valve housing 12 having an axial bore 13. A valve seat 14 is disposed at the lower end of the bore 13. A ball 16 is disposed inside the bore 13 above the valve seat 14. The valve seat 14 has a conical surface 17 (or other surface shape) such that a circular region on the ball 16 is in contact with the conical surface 17 when the valve 10 is in a closed state, as illustrated. For example, if the valve 10 is an inlet check valve for a pump head, the pump may be executing a delivery stroke such that the pressure of the liquid at the valve outlet 18 is greater than the pressure at the valve inlet 20. Consequently, the pressure differential results in a force applied downward to move the ball 16 against the valve seat 14 and thereby block the fluid path through the valve 10. Notwithstanding, the vertical orientation of the valve 10 with respect to gravity means that gravity acts to move the ball 16 against the valve seat 14 in the absence of a pressure differential.

The check valve 10 opens when the pressure at the valve inlet 20 is sufficiently greater than the pressure at the valve outlet 18. Under this condition, the ball 16 moves away from the valve seat 14 to allow liquid to flow (upward in the figure). The pressure differential necessary to move the ball 16 off the valve seat 14 is the cracking pressure.

Figure 2:
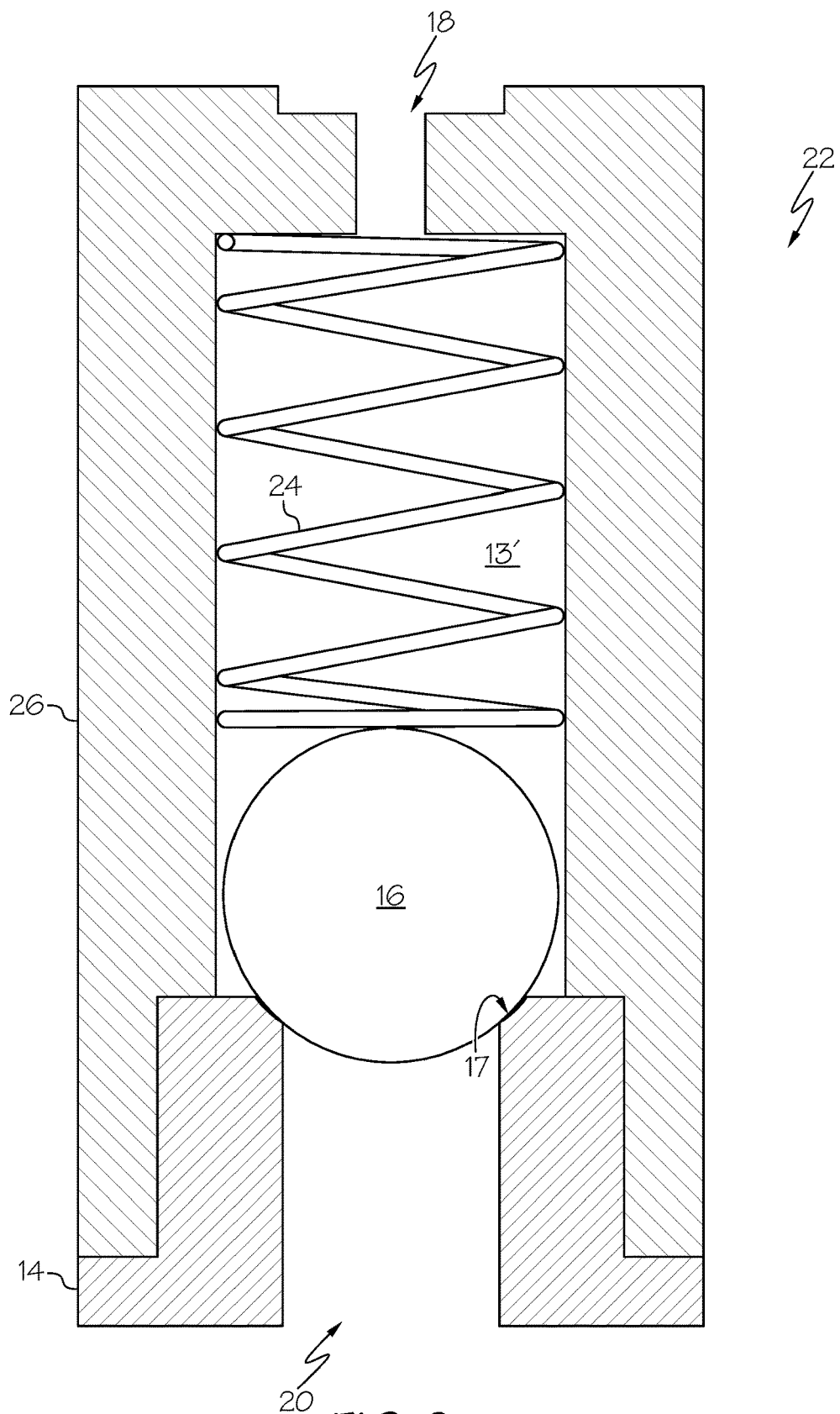
FIG. 2 is a simplified cross-sectional view of an example of a spring-assisted check valve in a closed state.

Ball and seat check valves sometimes are configured to apply a supplemental loading force, i.e., a "restoring force," to the ball. For example, the supplemental loading force may be applied by a spring disposed inside the valve and arranged to push the ball 16 toward the valve seat 14. For example, FIG. 2 shows a simplified cross-sectional view of an example of a spring-assisted check valve 22 in a close state. The valve 22 includes a compressed spring 24 disposed in an axial bore 13' of a valve housing 26 and arranged to apply a downward force on the ball 16. The spring 24 may be a helical coil spring and is positioned with one end at the upper end of the axial bore 13' near the valve outlet 18 and the other end in contact with the ball 16. The diameter of the spring 24 is slightly less than the diameter of the axial bore 13' to maintain the spring 24 substantially coaxial with the bore axis. The supplemental loading force applied by the compressed spring 24 results in a positive closing force on the ball 16 regardless of the direction of fluid flow and the orientation of the valve 22 with respect to gravity. This supplemental loading force facilitates a fast closure of the check valve 22 during a transition of the pump from an intake stroke to a delivery stroke; however, the cracking pressure of the valve 22 is substantially greater than for the similarly sized check valve 10 of FIG. 1.

Due to limitations on manufacturing and design tolerances, the cracking pressure defined across similarly designed spring-assisted check valves may vary substantially due to variations in the spring forces of the manufactured springs. By way of a non-limiting example, the cracking pressure of one evaluated check valve employing a compressed spring varied between about 3 KPa to greater than 10 KPa (e.g., 0.4 psi to 1.5 psi). The wide cracking pressure range can limit the resolution of manufacturing tests used to confirm check valve quality after assembly is completed and can make it difficult to determine if the cracking pressure for a valve 22 is due in part to contaminants, such as detergent or lapping compound residues, on the ball 16 and/or the valve seat 14.

Figure 3:
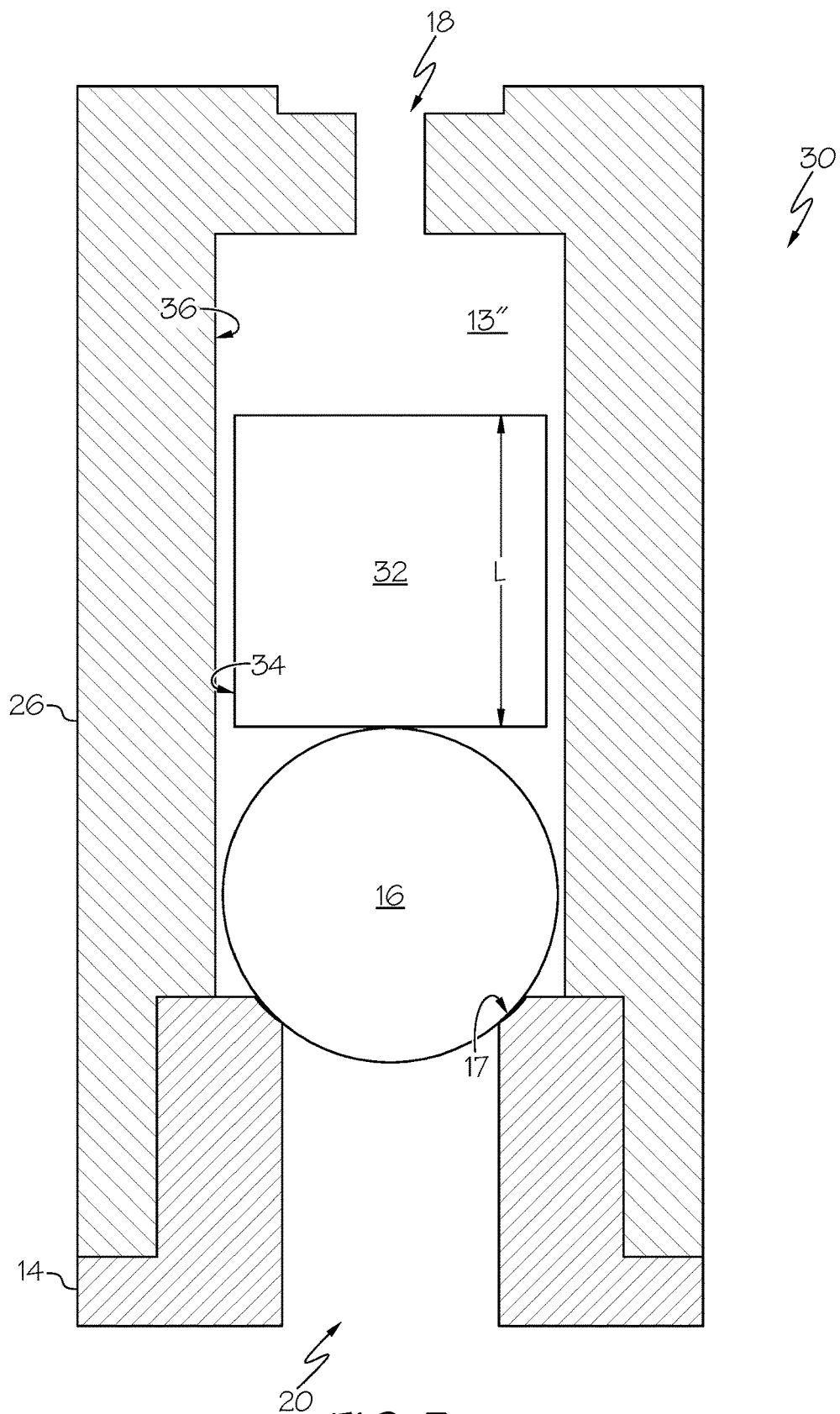
FIG. 3 is a simplified cross-sectional view of an example of a check valve utilizing a cylindrical weight to apply a supplemental force to set a ball into a valve seat.

FIG. 3 is a simplified cross-sectional view of a check valve 30 using an alternative means for applying a supplemental loading force. The valve 30 includes a cylindrical weight 32 disposed in the axial bore 13" between the ball 16 and the valve outlet 18. The cylinder axis of the cylindrical weight 32 is approximately coaxial with the bore axis. The diameter of the cylindrical weight 32 is closely matched to the bore diameter and is approximately equal to or slightly less than the diameter of the ball 16. For example, the clearance between the side surface 34 of the cylindrical weight 32 and the bore surface 36 may be on the order of 0.2 mm (0.008 in.). The mass of the static cylindrical weight 32 is easily controlled as it is not significantly affected by manufacturing tolerances. Consequently, the check valve 30 has a more predictable cracking pressure than a similarly sized spring-assisted check valve although the supplemental force is generally significantly less. For example, the cracking pressure for a check valve having a cylindrical weight may have a cracking pressure of a few KPa (i.e., a few tenths psi) or less.

Due to the extended surface area of the side surface 34 of the cylindrical weight 32, defined by its axial length L and circumference, and the small gap between the side surface 34 and the bore surface 36, the liquid pumped through the check valve 30 can act like an adhesive between the cylindrical weight 32 and the bore surface 36. The close fit and relatively large surface can lead to viscous drag between the two surfaces 34 and 36, which can slow down the response time of the cylindrical weight 32 in assisting with the re-seating of the ball 16 against the valve seat 14. This delay in re-seating can lead to intermittent pressure drops in the pump output flow which may be more prevalent in more viscous solvents or as sticky residues from solvent contaminants build up on the surfaces 34 and 36. Moreover, these disruptions in the pump output flow can degrade the accuracy and repeatability of chromatographic separations.

In brief overview, embodiments disclosed herein are directed to a check valve having a spherical loading element. The valve includes a valve housing having a bore that extends at least part way between a first (inlet) end that receives a fluid and a second (outlet) end that provides the fluid when the valve is in an open state. A valve seat is disposed proximate to (i.e., near or at) a first end of the bore. A ball is disposed in the bore and is movable between a closed position and an open position. The closed position is defined as the position of the ball when received against the valve seat such that the ball prevents a flow of fluid through the bore. The ball is in the open position when it is displaced at any position away from the valve seat to allow the flow of fluid through the bore. A spherical loading element is disposed in the bore between the ball and the second (opposite) end of the bore. The spherical loading element is movable within the bore. When the valve transitions to the closed state, the spherical loading element applies a supplemental force to assist in movement of the ball toward the valve seat and to maintain the ball against the valve seat.

Check valves utilizing a spherical loading element achieve the benefits of the static cylindrical weight by applying a supplemental force on a check valve ball, including providing a similar low cracking pressure (e.g., less than about 3 KPa (about 0.5 psi)) that is predictable and which does not vary significantly between similarly manufactured valves. This advantageously enables the check valve to be more accurately evaluated for cracking pressure after manufacture. Any valves exhibiting cracking pressures outside a small range about the nominal cracking pressure are often subject to a ball and/or valve seat that is contaminated. The small cracking pressure range is a result of a tight tolerance of the mass of the manufactured spherical loading elements such that the range is significantly less that the cracking pressure range for similarly sized spring-assisted check valves.

The spherical loading element provides an additional advantage of significantly reducing the potential for viscous and adhesive drag between the element and the adjacent bore surface, thereby avoiding the potential for delayed response times and system pressure disturbances. This benefit occurs, in part, from the smaller surface area of the spherical loading element that is near to the bore surface. In addition, unlike the limitation in movement of the cylindrical weight to only slide axially within the bore as the check valve transitions between intake and delivery strokes of a pump, the spherical loading element is able to both slide and roll inside the bore. The additional freedom of movement provides less restriction both during initiation of solvent intake when the ball is displaced from the valve seat and during the termination of solvent flow through the valve when the pump transitions to a delivery stroke and a downward force is applied to move the ball toward and against the valve seat.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

Figure 4:
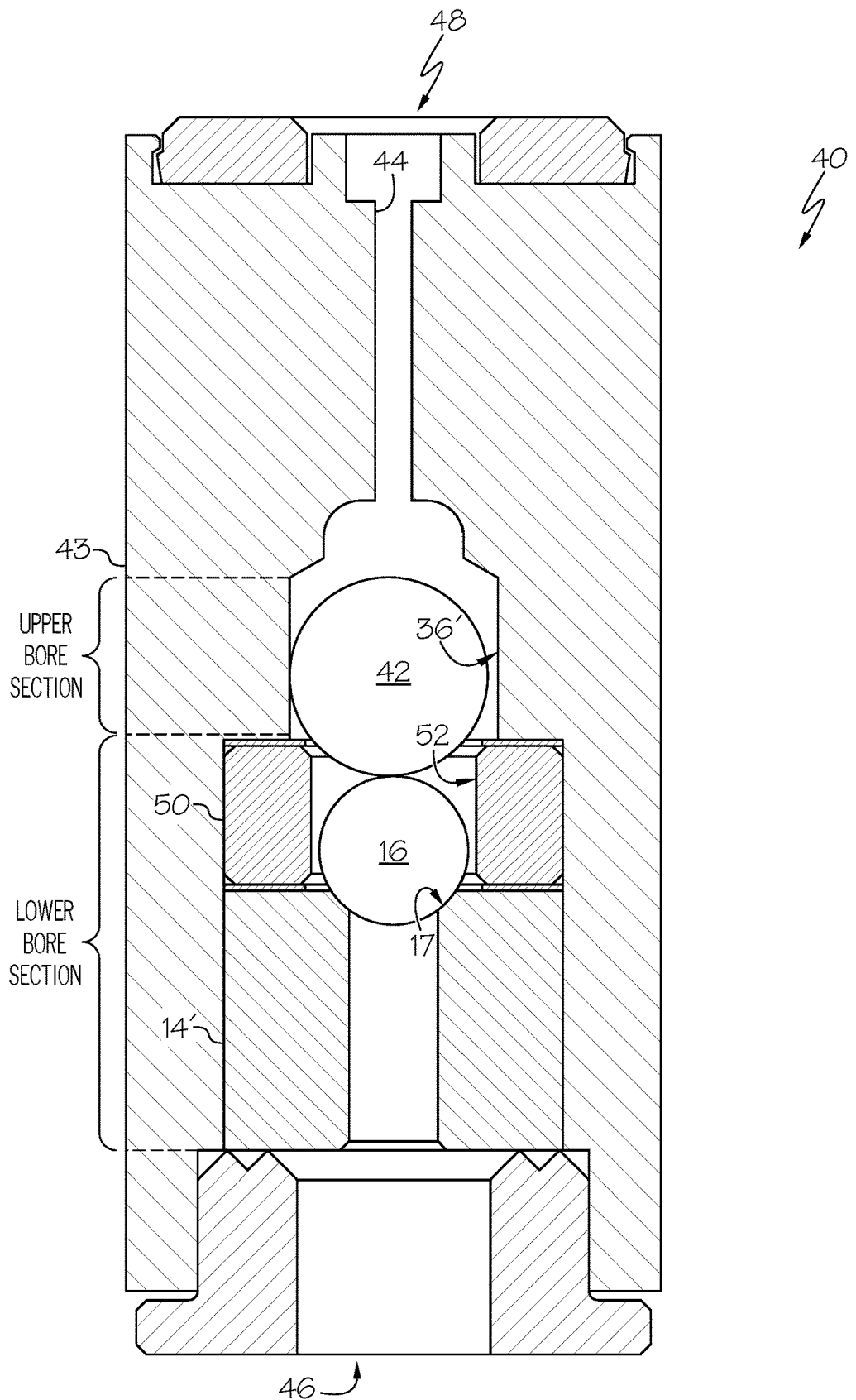
FIG. 4 is a simplified cross-sectional view of a check valve utilizing a spherical loading element to apply a supplemental force to set a ball into a valve seat.

FIG. 4 is a simplified cross-sectional depiction of a check valve 40 having a spherical loading element 42. The check valve 40 may be formed as a cartridge that can be placed into an adapter that attaches the cartridge to a pump head. Gaskets are used at the inlet and outlet ends of the cartridge to seal the cartridge. The check valve 40 includes a valve housing 43 having a housing channel 44 that conducts a flow of fluid from a valve inlet 46 to a valve outlet 48 when the valve 40 is in an open state. The valve housing 43 includes a two-section axial bore that extends from the lower end of the housing channel 44 toward the valve inlet 46. In the illustrated embodiment, the bore has a lower bore section and an upper bore section. The diameter of the lower bore section is greater than the diameter of the upper bore section. The valve seat 14' is disposed in the lower bore section along with a spacer element 50 disposed above the valve seat 14'. The spacer element 50 has a central aperture with a diameter that is slightly greater than the diameter of the ball 16. For example, the diametral clearance between the ball 16 and the inner surface 52 of the spacer element 50 may be in a range from approximately 0.008 in. to approximately 0.015 in. This small clearance ensures that when the ball 16 drops or is pushed toward the valve seat 14', the ball 16 remains nearly centered with respect to the bore axis. Consequently, any rolling action of the ball 16 on the valve seat 14' that might delay a complete closure of the valve 40 is nearly or completely avoided.

The spherical loading element 42 is disposed in the upper bore section between the ball 16 and the upper end. The diameter of the spherical loading element 42 is preferably greater than the diameter of the ball 16 and, as illustrated, may be greater than the inner diameter of the spacer element 50 as long as the axial height of the spacer element 50 allows the spherical loading element 42 to be in contact with and apply force to the ball 16 when the ball 16 is against the valve seat 14'.

The mass of the spherical loading element can be easily controlled during manufacture using common manufacturing tolerances. As a result, the weight variations between spherical loading elements 42 made to the same dimensional specifications will be insignificant and therefore the cracking pressure variations for similarly designed check valves are tightly controlled. For example, commercially-available balls are available that are ground to high precision, with diameter tolerances of +/−0.0005 in. or less. Thus, the supplemental force variation is less than +/−2%. In some embodiments, the spherical loading element 42 is made of tantalum which results in a high supplemental loading force due to its high density. In other embodiments, the spherical loading element may be made of stainless steel or another material that is substantially chemically inert with respect to pump solvent.

For embodiments where the spherical loading element 42 may have a significantly greater diameter than the ball 16, as illustrated, the greater diameter provides for significant additional loading element mass for the ball 16 as the volume of the spherical loading element 42 is proportional to the cube of its radius.

Unlike a cylindrical weight, the spherical loading element 42 only has a small surface area that is in close proximity to the bore surface 36'. Thus, the check valve 40 avoids the surface adhesive effect and viscous drag associated with a cylindrical weight. Advantageously, the response time of the spherical loading element 42 in the re-seating of the ball 16 against valve seat 14' is improved, thereby helping to reduce or avoid associated pressure drops in the pump output flow. Thus, the check valve 40 can yield improvements in the accuracy and repeatability of chromatographic separations.

Figure 5:
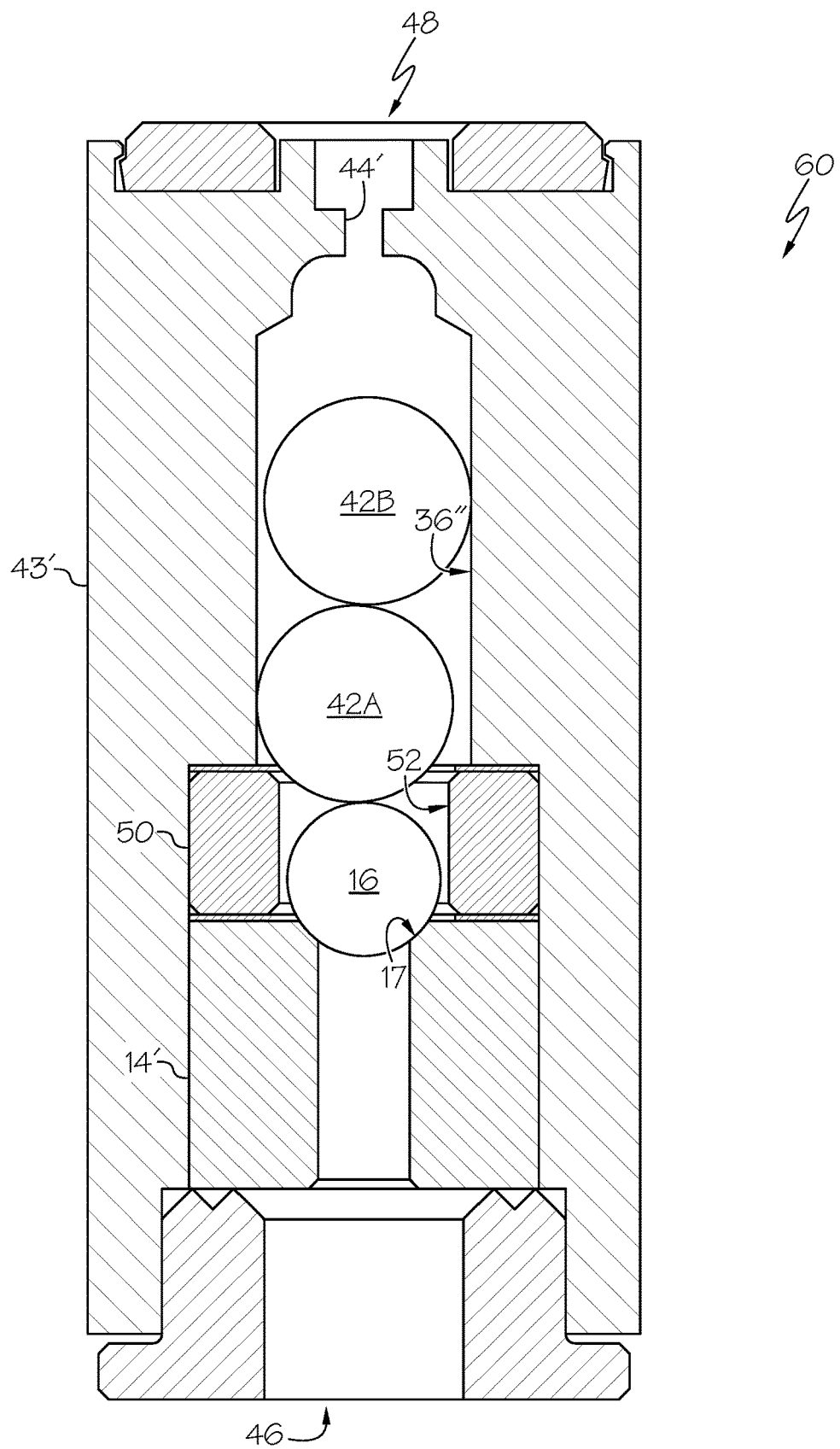
FIG. 5 is a simplified cross-sectional view of an example of a check valve utilizing multiple spherical loading elements.

FIG. 5 is a simplified cross-sectional view of another example of a check valve 60 utilizing a spherical loading element 42. The structure of the valve 60 is similar to that of the check valve 40 of FIG. 4; however, the upper section of the bore is longer and extends upward closer to the valve outlet 48 while the housing channel 44' is shorter than the counterpart housing channel 44. This configuration allows for an additional spherical loading element 42B above the lower spherical loading element 42A. In other embodiments, the valve housing 43' has a greater axial length that allows for a longer upper bore section and therefore more than one additional spherical loading element may be used.

Figure 6:
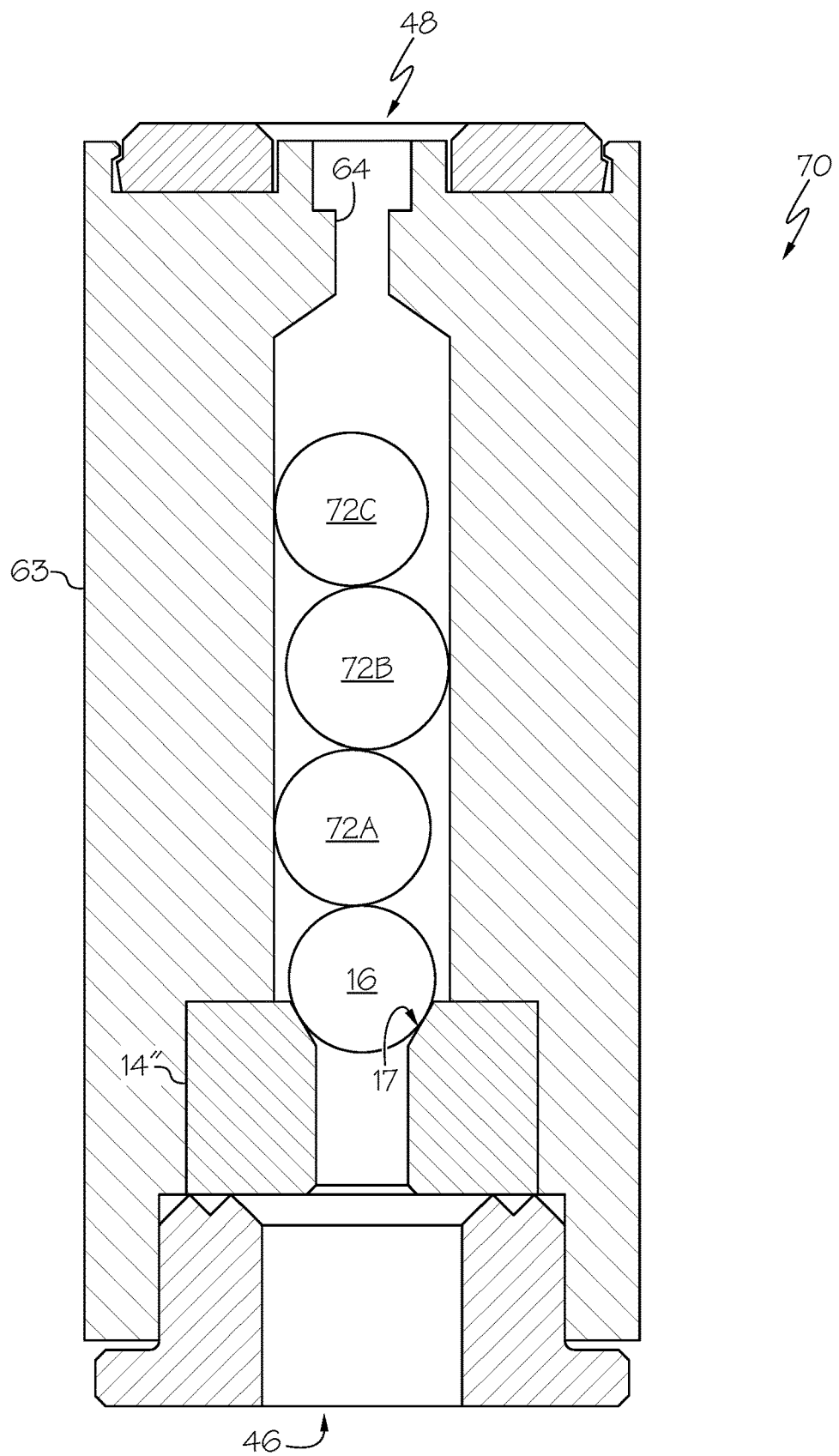
FIG. 6 is a simplified cross-sectional view of another example of a check valve utilizing multiple spherical loading elements.

FIG. 6 is a depiction of another example of a check valve 70 having multiple spherical loading elements 72A, 72B and 72C. In this example, the diameters of the spherical loading elements 72 are the same; however, in other embodiments one or more of the spherical loading elements 72 has a different diameter than the other spherical loading elements 72. As illustrated, the diameter of the ball 16 is slightly smaller by a few percent than the diameter of the spherical loading elements 72 and the bore diameter is constant along its entire length although this is not a requirement. In some embodiments, the spherical loading elements 72 may be made from different materials such that the mass and/or weight of the spherical loading elements 72 differ. The materials, diameters and number of spherical loading elements 72 used can be varied to achieve a particular supplemental loading force.

In the embodiments described above, the bore may have a single diameter or may be "sectioned" to have different diameters or different effective diameters by use of a spacer element. In other embodiments, the bore may have a non-circular cross-section that extends along at least part of the length of the bore. A non-circular cross-section can, in some instances, facilitate the passage of solvent past the one or more spherical loading elements. For example, the bore may have a square or other rectangular cross-section or more generally an elliptical cross-section or polygonal cross-section. Such bores may be formed using various types of manufacturing processes that, in some implementations, may be different from a conventional boring or drilling process.

Although the examples of check valves having a spherical loading element described above are based primarily on a ball and valve configuration, it should be recognized that the principles described herein are applicable to other valve configurations. For example, other types of sealing members may be used to engage and disengage from each other to prevent and enable the flow of liquid through the valve wherein one of the sealing members is assisted by the supplemental force applied by one or more spherical loading elements.

While various examples have been shown and described, the description is intended to be exemplary, rather than limiting and it should be understood by those of ordinary skill in the art that various changes in form and detail may be made therein without departing from the scope of the invention as recited in the accompanying claims.

What is claimed is:

1. A check valve for a liquid chromatography system, comprising:
    a valve housing having a bore with a first end and a second end, wherein at least one of the first end or the second end is in fluid communication with a port of the liquid chromatography system;
    a valve seat disposed proximate to the first end of the bore;
    a ball disposed in the bore and movable in an axial direction of the bore and at least one additional degree of movement between a closed position in which the ball is received against the valve seat and prevents a flow of fluid through the bore and an open position in which the ball is displaced from the valve seat and allows the flow of fluid through the bore when a pump of the liquid chromatography system transitions between an intake stroke and a delivery stroke; and
    a spherical loading element disposed in the bore and movable between the ball and the second end of the bore, the spherical loading element applying a supplemental force to move the ball against the valve seat during closing of the check valve, wherein the bore has a lower bore section proximate to the first end and an upper bore section proximate to the second end and wherein a diameter of the lower bore section is greater than a diameter of the upper bore section, wherein the spherical loading element has a lower portion that contacts the ball in the lower bore section and an upper portion in the upper bore section, wherein the spherical loading element has a diameter that is greater than a diameter of the ball.

2. The check valve of claim 1 wherein the spherical loading element is formed of a material from a group of materials consisting of at least one of tantalum, stainless steel, tungsten carbide, Inconel® or a non-ferrous alloy.

3. The check valve of claim 1 further comprising at least one additional spherical loading element disposed in the bore between the spherical loading element and the second end of the bore.

4. The check valve of claim 3 wherein the spherical loading element has a diameter that is different from a diameter of at least one of the additional spherical loading elements.

5. The check valve of claim 3 wherein the spherical loading element has a mass that is different from a mass of at least one of the additional spherical loading elements.

6. The check valve of claim 1 wherein the bore has a non-circular cross-section.

7. The check valve of claim 1 wherein a cracking pressure of the check valve is less than 5 KPascals.

8. The check valve of claim 1 wherein the ball is disposed in the lower bore section when received against the valve seat.

9. The check valve of claim 1 further comprising a spacer element having an aperture and disposed above the valve seat in the lower bore section, wherein a diameter of the aperture is less than a diameter of the upper bore section and wherein the ball is disposed in the aperture.

10. The check valve of claim 9, further comprising a diametral clearance between the ball and an inner surface of the spacer element having a range between 0.008" and 0.015".

11. The check valve of claim 1 further comprising a fluid channel extending from the second end of the bore to an outlet of the valve housing.

12. The check valve of claim 1, wherein the pump executes the delivery stroke so that a pressure of the flow of fluid at the second end of the bore is greater than a pressure at the first end of the bore to block a fluid path through the bore.

13. The check valve of claim 1, wherein the additional degree of movement permits the spherical loading element to both slide and roll inside the bore when the pump of the liquid chromatography system transitions between an intake stroke and a delivery stroke.

14. The check valve of claim 1, wherein the check valve is formed as a cartridge that can be placed into an adapter that attaches the cartridge to a pump head, and wherein the check valve includes a first gasket at the first end and a second gasket at the second end for sealing the cartridge.

15. A liquid chromatography system, comprising:
    a pump;
    a port; and
    a check valve, comprising:
        a valve housing having a bore with a first end and a second end, wherein at least one of the first end or the second end is in fluid communication with the port;
        a valve seat disposed proximate to the first end of the bore;
        a ball disposed in the bore and movable in an axial direction of the bore and at least one additional degree of movement between a closed position in which the ball is received against the valve seat and prevents a flow of fluid through the bore and an open position in which the ball is displaced from the valve seat and allows the flow of fluid through the bore when the pump transitions between an intake stroke and a delivery stroke; and
        a spherical loading element disposed in the bore and movable between the ball and the second end of the bore, the spherical loading element applying a supplemental force to move the ball against the valve seat during closing of the check valve, wherein the bore has a lower bore section proximate to the first end and an upper bore section proximate to the second end and wherein a diameter of the lower bore section is greater than a diameter of the upper bore section, wherein the spherical loading element has a lower portion that contacts the ball in the lower bore section and an upper portion in the upper bore section, wherein the spherical loading element has a diameter that is greater than a diameter of the ball.

16. The liquid chromatography system of claim 15, further comprising at least one additional spherical loading element disposed in the bore between the spherical loading element and the second end of the bore.

17. The liquid chromatography system of claim 15, wherein the bore has a non-circular cross-section.

18. The liquid chromatography system of claim 15, wherein a cracking pressure of the check valve is less than 5 KPascals.

19. The liquid chromatography system of claim 15, wherein the pump executes the delivery stroke so that a pressure of the flow of fluid at the second end of the bore is greater than a pressure at the first end of the bore to block a fluid path through the bore.

20. A check valve for a liquid chromatography system, comprising:

a valve housing having a bore with a first end and a second end, wherein at least one of the first end or the second end is in fluid communication with a port of the liquid chromatography system;

a valve seat disposed proximate to the first end of the bore;

a ball disposed in the bore and movable in an axial direction of the bore and at least one additional degree of movement between a closed position in which the ball is received against the valve seat and prevents a flow of fluid through the bore and an open position in which the ball is displaced from the valve seat and allows the flow of fluid through the bore when a pump of the liquid chromatography system transitions between an intake stroke and a delivery stroke;

a spherical loading element disposed in the bore and movable between the ball and the second end of the bore, the spherical loading element applying a supplemental force to move the ball against the valve seat during closing of the check valve, wherein the bore has a lower bore section proximate to the first end and an upper bore section proximate to the second end and wherein a diameter of the lower bore section is greater than a diameter of the upper bore section, wherein the spherical loading element has a lower portion that contacts the ball in the lower bore section and an upper portion in the upper bore section; and a spacer element having an aperture and disposed above the valve seat in the lower bore section, wherein a diameter of the aperture is less than a diameter of the upper bore section and wherein the ball is disposed in the aperture.

\* \* \* \* \*